United States Patent
Kutluay et al.

(10) Patent No.: US 11,441,643 B2
(45) Date of Patent: Sep. 13, 2022

(54) TRANSMISSION ASSEMBLY COMPRISING AXIAL TILT SEGMENTS

(71) Applicants: ZF Friedrichshafen AG, Friedrichshafen (DE); ZF Wind Power Antwerpen N.V., Lommel (BE)

(72) Inventors: Umit Kutluay, Friedrichshafen (DE); Koen Krieckemans, Noorderwijk (BE); Yvan Berkmans, Hechtel-Eksel (BE); Michel Goovaerts, Hulshout (BE); Roger Bogaert, Dendermonde (BE); Maarten Ooms, Geel (BE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 146 days.

(21) Appl. No.: 16/606,225

(22) PCT Filed: Mar. 28, 2018

(86) PCT No.: PCT/EP2018/057847
§ 371 (c)(1),
(2) Date: Feb. 26, 2021

(87) PCT Pub. No.: WO2018/192756
PCT Pub. Date: Oct. 25, 2018

(65) Prior Publication Data
US 2022/0082157 A1    Mar. 17, 2022

(30) Foreign Application Priority Data
Apr. 20, 2017   (DE) ............ 10 2017 206 680.6

(51) Int. Cl.
*F16H 1/48*   (2006.01)
*F16C 17/06*  (2006.01)
(Continued)

(52) U.S. Cl.
CPC ............ *F16H 1/48* (2013.01); *F16C 17/06* (2013.01); *F16C 23/048* (2013.01);
(Continued)

(58) Field of Classification Search
CPC ........ F16H 1/48; F16H 57/082; F16H 57/043; F16H 2057/085; F03D 15/00;
(Continued)

(56) References Cited

U.S. PATENT DOCUMENTS

| 1,117,504 | A | * | 11/1914 | Kingsbury | F16C 17/06 384/307 |
| 5,382,097 | A | * | 1/1995 | Ide | F16C 17/065 384/122 |
| 5,593,362 | A | * | 1/1997 | Mizuta | F16H 57/082 475/348 |
| 5,765,951 | A | | 6/1998 | Wyndorps et al. | |
| 5,827,147 | A | * | 10/1998 | Stewart | F16C 33/043 475/331 |

(Continued)

FOREIGN PATENT DOCUMENTS

| DE | 4213992 A1 | 11/1993 |
| DE | 4343965 A1 | 6/1995 |

(Continued)

*Primary Examiner* — Justin Holmes
(74) *Attorney, Agent, or Firm* — Leydig, Voit & Mayer, Ltd.

(57) ABSTRACT

A gear assembly includes a planetary gear set having a sun gear, planet gears, and a ring gear. The planet gears are respectively rotatably mounted by a bearing on a respective planetary pin. The respective planetary pin is connected to a planetary carrier. Tilting pads arranged radially circumferentially with respect to the planetary pin are provided on sides of the planetary carrier facing the planet gears. The planetary carrier has, on sides facing the planet gears, recesses arranged radially circumferentially with respect to the planetary pin and corresponding to the tilting pads. The (Continued)

recesses are configured to receive at least part of the tilting pads.

11 Claims, 3 Drawing Sheets

(51) Int. Cl.
  *F16C 23/04* (2006.01)
  *F16H 57/04* (2010.01)
  *F16H 57/08* (2006.01)
  *F03D 15/00* (2016.01)

(52) U.S. Cl.
  CPC ....... *F16H 57/0482* (2013.01); *F16H 57/082* (2013.01); *F03D 15/00* (2016.05); *F05B 2260/40311* (2013.01); *F16C 2361/61* (2013.01); *F16H 57/043* (2013.01); *F16H 2057/085* (2013.01)

(58) Field of Classification Search
  CPC ............ F05B 2260/40311; F16C 17/06; F16C 23/048; F16C 2360/31; F16C 2361/61
  See application file for complete search history.

(56) References Cited

U.S. PATENT DOCUMENTS 10,047,792 B2   8/2018  Guetter et al.
2012/0108380 A1   5/2012  Dinter et al.

FOREIGN PATENT DOCUMENTS

| DE | 102004047161 A1 * | 3/2006 | ........... F16H 57/082 |
|----|---|---|---|
| DE | 102013221265 A1 | 5/2015 | |
| EP | 0757187 A2 | 2/1997 | |
| EP | 2383480 A1 | 11/2011 | |
| EP | 2955413 A1 | 12/2015 | |
| JP | 2009108996 A * | 5/2009 | ........... F16H 57/082 |
| WO | WO 2007025117 A1 | 3/2007 | |
| WO | WO 2011069666 A1 | 6/2011 | |

* cited by examiner

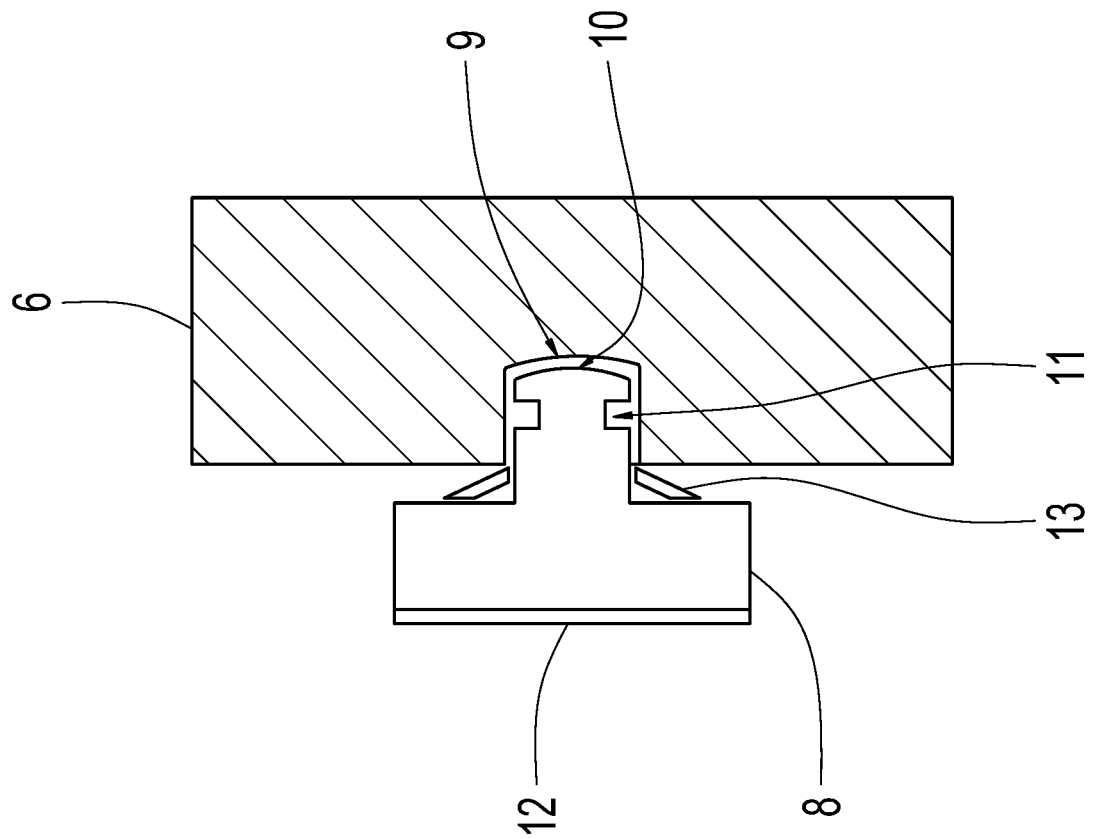
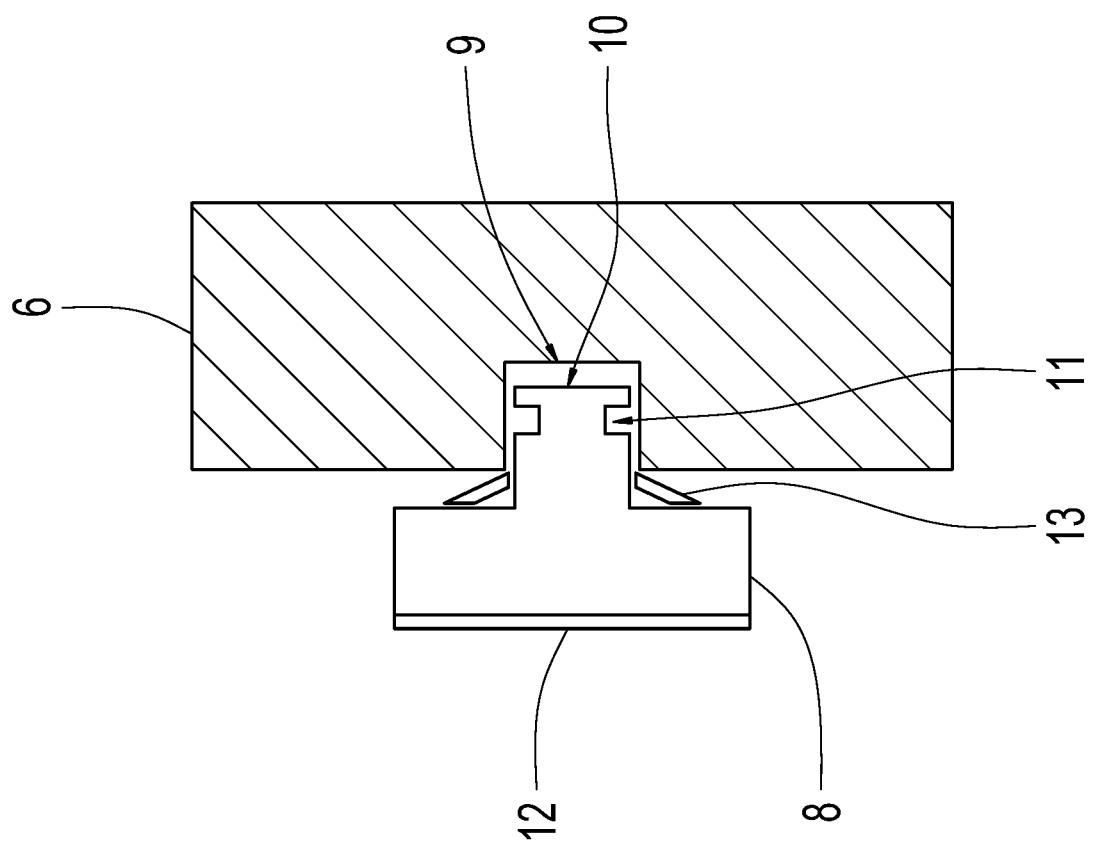

TRANSMISSION ASSEMBLY COMPRISING AXIAL TILT SEGMENTS

CROSS REFERENCE TO RELATED APPLICATIONS

This application is a U.S. National Stage Application under 35 U.S.C. § 371 of International Application No. PCT/EP2018/057847 filed on Mar. 28, 2018, and claims benefit to German Patent Application No. DE 10 2017 206 680.6 filed on Apr. 20, 2017. The International Application was published in German on Oct. 25, 2018 as WO 2018/192756 A1 under PCT Article 21(2).

FIELD

The present invention relates to a gear assembly having a planetary gear set and axial tilting pads, which is used in particular in transmissions of wind turbines. The present invention further relates to a method for mounting a gear mechanism.

BACKGROUND

Providing axial tilting pads in order to axially support rotatable components is known from the prior art, for example from WO 2011/069666 A1. In the present case, a base plate has apertures which are assigned to the axial tilting pads and which each form an elastically deformable cantilever beam which forms with its free end a support surface for supporting the assigned axial tilting pad. The elastically deformable support beams achieve a local resilience of the support surfaces for supporting the assigned axial tilting pads, which makes it possible to compensate for an uneven load distribution over the axial bearing sliding surfaces.

SUMMARY

In an embodiment, the present invention provides a gear assembly. The gear assembly includes a planetary gear set having a sun gear, planet gears, and a ring gear. The planet gears are respectively rotatably mounted by a bearing on a respective planetary pin. The respective planetary pin is connected to a planetary carrier. Tilting pads arranged radially circumferentially with respect to the planetary pin are provided on sides of the planetary carrier facing the planet gears. The planetary carrier has, on sides facing the planet gears, recesses arranged radially circumferentially with respect to the planetary pin and corresponding to the tilting pads. The recesses are configured to receive at least part of the tilting pads.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1A provides a schematic illustration of a first embodiment of tilting pads and their arrangement on a planetary carrier;

FIG. 1B provides a schematic illustration of a second embodiment of the tilting pads and their arrangement on a planetary carrier;

DETAILED DESCRIPTION

Figure 2:
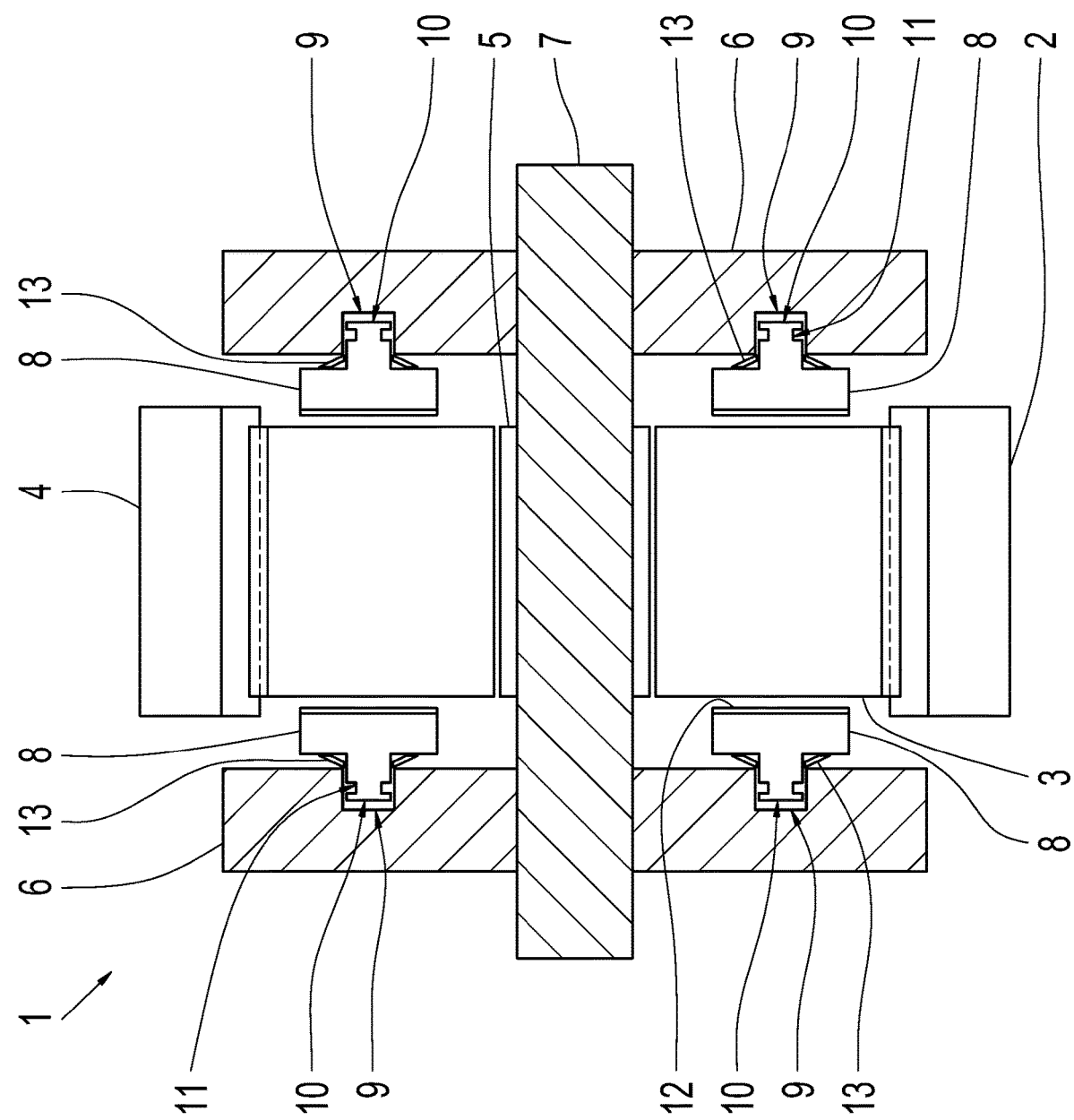
FIG. 2 provides a schematic illustration of a gear assembly according to an embodiment of the invention.

The present invention provides for a tilting-pad bearing for axial support, which effectively ensures axial support on the one hand and at the same time is simple to mount.

The present invention provides for a gear assembly having a planetary gear set with a sun gear, planet gears and a ring gear. The planet gears are rotatably mounted on a planetary pin. The bearing is particularly advantageously a friction bearing or a slide bearing. For this purpose, a (slide) bearing bush, for example of a brass alloy, can in particular be provided on the planetary pin. However, the bearing bush may be made of other metals, metal alloys or even of suitable plastics. The planetary pin is connected to a planetary carrier, wherein the planetary carrier can consist of one or more parts, in particular of two symmetrical half-parts.

The teeth of the planet gears engage on the one hand with the teeth of the ring gear and on the other hand with the teeth of the sun gear. Frequently, the teeth are so-called "helical teeth." Axial forces resulting therefrom and acting on the planetary gear set ideally add up to zero, but sometimes generate a tilting moment on the planet gears around the planetary axle.

This is counteracted by tilting pads which are provided on the planetary carrier, wherein each of the tilting pads is arranged on the side of the planetary carrier facing the planet gears. A radially circumferential assembly of a plurality of tilting pads per planetary carrier side is provided in relation to the respective planetary pin. The tilting pads thus act as spacers and absorb axial forces in order to in particular counteract a tilting of the planet gears. An even or odd number of tilting pads per planetary carrier side may be provided. It may further be provided that the tilting pads are permanently in contact with the planet gears, in order to prevent even minimal tilting or to support axial forces acting from the outside. In further advantageous embodiments, there is an air and/or lubricating gap, although a minimal one, between the planet gear and the tilting pads. Only when tilting occurs, one or more tilting pads come to abut partially or completely against the tilted planet gear.

The planetary carrier further advantageously has recesses which are suitable for receiving at least part of the tilting pads. The recess is a depression, for example a through hole or preferably a blind hole. The tilting pads are not received completely circumferentially by the recesses but project laterally therefrom, or protrude from the planetary carrier cheeks in the direction of the planet gears. A contact surface can thus be provided as needed.

The tilting pads advantageously have a body with a sliding surface on a first side and a shaft on a second side. The first side and the second side are arranged opposite each other. Preferably, the tilting pads have a cylindrical contour with a first diameter, and the shaft also has a cylindrical contour with a second diameter. Advantageously, the first diameter is greater than the second diameter. This results in a T-shaped contour of the tilting pads in cross-section. In this context, the term "cylindrical" means that the first and the second side have a circular or at least approximately round base surface. However, the tilting pads can also have a contour differing therefrom, for example a rectangular contour, or even a contour in the form of a circular section. A tilting pad with elliptical first and second sides is also conceivable.

The first side serves as a contact surface on the planet gears, whereas the shaft or the free end is arranged orthogonally to the first or the second side and at least partially projects into the corresponding recess. In particular, the free end does not project completely into the recess, so that a gap remains between the second side of the tilting pad and the planetary carrier, in order to ensure flexibility with regard to tangential deflection. This would not be the case if the tilting pads also abutted on a flat surface on the planetary carrier with the side facing away from the planet gears.

Further advantageously, the tilting pads can have a circumferential groove on a side facing the free end. This is particularly suitable for receiving a securing element. The securing element is, for example, an O-ring or an expanding ring which projects beyond the circumference of the free end and comes to rest on the side walls of the recesses. The securing element is squeezed or compressed into the respective recess. This produces a clamping effect which in particular prevents the tilting pad from falling out, above all during assembly or even maintenance and disassembly. At the same time, the flexibility for compensating a tangential deflection is maintained. The securing element may be made of plastic, rubber or metal; advantageously, it is a (conditionally) resilient material in comparison to the tilting pads or the planetary carrier.

Advantageously, a clearance fit is provided between the free end, that is to say the shaft of the tilting pad, and the recess, in order to allow compensating and relative movements of the components in relation to one another to a predetermined extent.

On the first side, the tilting pads have a (slide) coating which ensures a low frictional resistance between the tilting pad and the planet gear while at the same time minimizing wear. The coating may in particular be made of white metal or bronze, but may also be in the form of a thin hard-material layer of tungsten carbide (WC/C) or of a hard diamond-like carbon (DLC) or of plastic. Porous sintered materials, in particular ceramics, are also suitable. When a coating is provided on the first side, the body of the tilting pads consists of a different material, for example steel.

In alternative embodiments, the tilting pads may also consist of a suitable slide bearing solid material, such that a coating in the region of the sliding contact surface is omitted. Embodiments in which the entire body of the tilting pads is provided with a previously described coating are also conceivable. Ideally, the provision of a sufficient lubricant supply in a slide bearing ensures that a lubricating film is formed between the planetary bearing and the tilting pad. However, when the slide bearing is operated in the mixed friction region, as can more often occur in wind turbines during acceleration and deceleration processes, a completely separating lubricating film is no longer formed, such that the surfaces of the tilting pad and the planet gear come into contact. In these cases, a soft white-metal layer can wear and form grooves; the softer material (of a coating) is thus removed in the long run. Hard coatings are therefore particularly suitable for operation in mixed friction, since they practically do not wear out. The hard surface is dimensionally stable and retains its microgeometry due to the high wear resistance.

In addition, hard coatings tolerate a significantly higher surface load than soft white metal, such that the force-transmitting total area of the tilting pads can be reduced. This can be achieved by a smaller number of tilting pads or smaller tilting pad diameters.

In a particularly suitable manner, the thin hard-material layer is applied by means of a PVD method, wherein PVD describes a coating by means of physical vapor deposition (PVD). The simultaneous provision of a plurality of pads in the coating chamber, for example on a carrier, considerably reduces production costs.

According to a further development of the present invention, a spring element is provided between each of the tilting pad and the planetary carrier. The spring element is, for example, a disk spring, through which the free end projects and which comes to rest, on the one hand, on the side of the relevant tilting pad facing away from the planet gear and, on the other hand, on the side of the planetary carrier facing the planet gear. On the one hand, the spring element has the effect that the tilting pads do not move into an oblique position in an unloaded state. On the other hand, when a load, that is to say a tilting of the planet gear, is present, it is ensured that the tilting pads abut and are held against the planet gear with a (sliding) surface that is as large as possible. Avoiding an oblique position of the tilting pads is of great importance in particular during assembly, since a straight (i.e. parallel to the planetary carrier) alignment of the sliding surfaces of the tilting pads significantly facilitates assembly and at the same time makes it possible to implement small component tolerances. In particular, the tilting pads can spring inward axially, that is to say compensate for an axial offset, due to the respective spring element. The different tilting pads interact in such a way that, in the event of tilting, the tilting pads arranged diametrically in relation to the planetary pin spring inward analogously. In contrast, a tilting pad springs outward when an axially adjacent tilting pad springs inward.

Further advantageously, the tilting pads have at their free ends an at least partially tapering contour. This means that, for example, a chamfer may be provided at the free end, but a conical contour of the free end is also conceivable in further embodiments. As a result of the tapering contour of the free end, the possibility of compensating movements of the tilting pads is improved.

More preferably, the tilting pads have a spherical contour on the first side. This effectively prevents the occurrence of undesired edge wear. The spherical contour also has the effect that, even if the tilting pads are tilted, the compression or the pressure distribution is distributed symmetrically around the point of the smallest distance between the tilting pad and the planet gear. Without the provision of a spherical contour, the compression or pressure distribution would increase on one side in the case of tilting.

A separate supply of lubricant to the tilting pads can advantageously be omitted, since a sufficient lubricant supply is ensured by lubricant which emerges from the slide bearing, in this case the radial slide bearing between the planetary pin and planet gear.

According to a further aspect of the present invention, a method for mounting a gear mechanism is proposed. In this case, securing elements are first attached to the tilting pads in that they are pushed over the shaft into the circumferential groove. The tilting pads are then inserted into the recesses of the planetary carrier and the planet gears are subsequently introduced radially from the outside inward into the planetary carrier. In this respect, it is particularly important that the tilting pads are not in an oblique position. This can be achieved, for example, by using spring elements. However, it is also conceivable to use a mounting aid which brings/ holds the tilting pads into/in position. The mounting aid can be, for example, a device with thin metal sheets, which is arranged in the planetary carrier before the planet gears are introduced. In this case, a force may also be transmitted to the tilting pads by the mounting aid, as a result of which such tilting pads spring inward in the recesses and thereby temporarily provide even more free space, in order to introduce the planet gears into the planetary carrier. After the respective planet gear has been introduced, the mounting aid is pulled out again, the tilting pads spring out of the recesses and abut against the corresponding planet gear. The planet gears are subsequently brought into position in such a way that passages of the planet gears overlap with corresponding passages of the planetary carrier and the planetary pins are driven through.

Tilting pads with a spherical contour of the sliding surface and a coating with a thin hard-material layer on the spherical contour are particularly suitable for any axial bearings of rotatable components, not only for use in a planetary gear set for support between the planetary carrier and the planet gear.

FIG. 1A schematically shows a first embodiment of the tilting pads 8 along with the arrangement on a planetary carrier 6, which is shown here in a highly simplified manner only in sections. In the present case, the tilting pad 8 has a T-shaped contour with respect to the cross-section, a free end 10 projecting into a recess 9 of the planetary carrier 6. On a side opposite the free end, the tilting pad 8 has a coating 12 which abuts against a planet gear 3 as a (sliding) surface. The contour, which is T-shaped in cross-section, is attributable to a cylindrical contour of the tilting pad 8 with a cylindrical shaft.

A spring element 13 is furthermore arranged between the tilting pad 8 and the planetary carrier 6 and is configured as a disk spring in the present case. In this case, the shaft or the free end 10 of the tilting pad 8 projects through a passage of the spring element 13. The spring element 13 comes to rest, on the one hand, on a side of the tilting pad 8 facing the planetary carrier 6 and, on the other hand, on a side of the planetary carrier 6 facing the planet gear 3.

In addition, the tilting pad 8 has a circumferential groove 11 on a side of the shaft adjacent to the free end 10. This is provided for receiving a securing element, not shown here, for example an O-ring. As a result, the tilting pad 8 is held movably in the recess 9, but falling out of the recess 9 is effectively prevented. Alternatively to the use of an O-ring, a corresponding fixing medium, for example a flexible adhesive or a paste or a joint compound, could also be introduced into the recess 9. Similar properties as with a securing element designed as an O-ring could thereby be achieved. In the installed state, the shaft or the free end 10 of the tilting pad 8 projects into the recess 9 to such an extent that the circumferential groove 11 is likewise arranged within the recess 9.

FIG. 1B schematically shows a second embodiment of the tilting pads 8 along with their arrangement on the planetary carrier 6. The structure is substantially identical to the embodiment shown in FIG. 1A and described above. Differences result only in the contour of the free end 10 of the tilting pad 8 and of the corresponding recess 9 in the planetary carrier 6. In the present case, the free end 10 has a spherical contour, whereas the recess 9 has a plate-shaped contour. This has the advantage that, in the event of oblique positions of the tilting pad 8 due to tilting of the planet gear 3, a larger contact surface is provided between the tilting pad 8 and the planetary carrier 6, as a result of which the introduced axial forces can be better supported. It is also conceivable that only the tilting pad 8 has a spherical contour, whereas the recess 9 has a rectangular contour, as shown in FIG. 1A.

FIG. 2 shows a highly simplified schematic illustration of a gear assembly according to the invention. The planetary gear set 1 has a sun gear 2, planet gears 3 (one planet gear 3 in this simplified sectional view) and a ring gear 4. The teeth of the planet gears 3 engage with the teeth of the sun gear 2 and the ring gear 4, which is indicated by the dashed line in the tooth engagement region.

A bearing 5 is arranged between the planet gear 3 and a planetary pin 7, as a result of which the planet gear 3 is rotatably connected to the planetary pin 7. In this case, the bearing 5 is designed as a slide bearing.

The sun gear 2 is preferably connected in a rotationally fixed manner to a shaft, not shown here, the ring gear 4 preferably being fixedly connected to a non-rotatable component, for example the housing. In principle, embodiments in which the ring gear 4 is provided in a rotatable manner and the sun gear 2 is provided in a non-rotatable manner in a gear assembly are also conceivable.

The planet gears 3 are surrounded by the planetary carrier 6 on both sides in parallel arrangement. The planetary carrier 6 and planet gears 3 are connected to each other via the planetary pin 7. The planetary carrier 6 has four recesses 9 with respect to each planet gear 3, two on each side of the corresponding planet gear 3. The recesses 9 are arranged to be radially spaced apart in pairs. This means that on each side, two recesses are respectively provided diametrically to each other with respect to the planetary pin 7 in the planetary carrier 6. Tilting pads 8 as described above in FIGS. 1A and 1B are respectively introduced into the recesses 9. A gap is indicated between the tilting pads 8, more precisely the region of the coating 12, and the planet gear 3. As long as no axial forces occur, which, for example, cause tilting of the planet gear 3, no contact occurs between the tilting pad 8 and the planet gear 3 in the embodiment shown. Only if tilting occurs do the tilting pads 8 abut against the planet gear 3. Alternatively or additionally, however, outer axial forces may also arise, as a result of which the tilting pads come to rest on the planet gear 3. In the unloaded state shown, the tilting pads 8 are parallel or at least approximately aligned with their (sliding) surface parallel to the planetary carrier 6 or the planet gear 3 as a result of the spring element 13. As a result of the movable arrangement of the free end 10 of the tilting pads 8, compensating movements, in particular a deflection into a non-parallel arrangement with respect to the planetary carrier 6, can be realized. The movable arrangement of the tilting pads thus provides, in particular in comparison to known solutions of axial securing by means of a thrust washer, a contact or sliding surface which is as large and constant as possible.

In further embodiments, not shown, of the gear assembly according to the invention, the tilting pads 8 rest permanently on the planet gear in the region of the coating 12 or of the side facing the planet gear 3.

The tilting pads 8 are supplied with lubricant by means of lubricant which emerges from the bearing 5. No separate lubricant supply is thus required.

Figure 3:
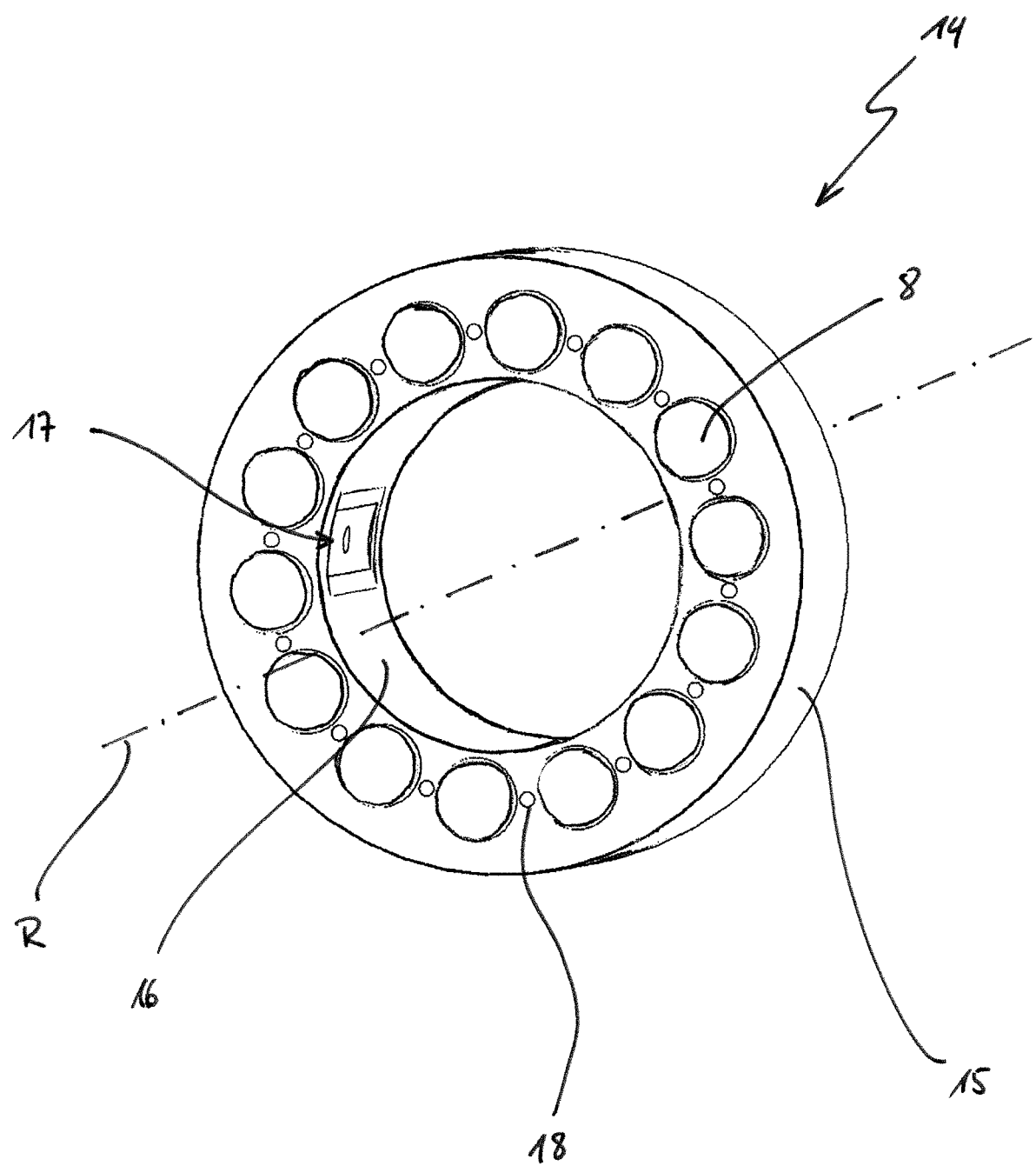
FIG. 3 provides a schematic illustration of a bearing element.

FIG. 3 shows in a perspective view a bearing element 14 as is used, for example, in a radial slide bearing. In this case, the bearing element 14 has an annular body 15 with an inner diameter and an outer diameter. The track 16 of the radial slide bearing is arranged along the inner diameter. At least one oil supply 17, by means of which lubricant (oil) is supplied to the radial slide bearing, is located within the track 16.

Furthermore, the bearing element 14 has a plurality of tilting pads 8 on an axial end face. Such tilting pads are arranged on the end face of the body 15 of the bearing element 14 in a radially circumferential manner around an axis of rotation R represented by dot and dash lines. An oil supply 18 of the tilting pads 8, wherein the oil supply openings is also arranged radially circumferentially around the axis of rotation R, is located between each of the two tilting pads 8. Lubricant is also supplied to the tilting pads 8 as a result. In addition to a radial bearing, the bearing element 14 with the tilting pads 8 arranged on the end face can also be used to axially support components, for example when a shaft deflects due to loads that arise.

The embodiments of the tilting pads 8 with a (slide) coating 12 shown in FIGS. 1A, 1B, 2 and 3 can be replaced individually or completely by embodiments of the tilting pads 8 made of a slide bearing solid material.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Planetary gear set
2 Sun gear
3 Planet gear
4 Ring gear
5 Bearing
6 Planetary carrier
7 Planetary pin
8 Tilting pad
9 Recess
10 Free end
11 Groove
12 Coating
13 Spring element
14 Bearing element
15 Body
16 Track of the radial slide bearing
17 Oil supply of the radial slide bearing
18 Oil supply of the tilting pads
R Axis of rotation

The invention claimed is:

1. A gear assembly, comprising:
   a planetary gear set including:
      a sun gear,
      planet gears, and
      a ring gear,
   wherein the planet gears are respectively rotatably mounted by a bearing on a respective planetary pin, and wherein the respective planetary pin is connected to a planetary carrier;
   wherein tilting pads arranged radially circumferentially with respect to the planetary pin are provided on sides of the planetary carrier facing the planet gears, the tilting pads being arranged offset from the planet gears to form gaps when the planet gears are not tilted, and
   wherein the planetary carrier has, on sides facing the planet gears, recesses arranged radially circumferentially with respect to the planetary pin and corresponding to the tilting pads, the recesses being configured to receive at least part of the tilting pads.

2. The gear assembly according to claim 1, wherein each of the tilting pads has a body with a sliding surface on a first side and a shaft on a second side, the first side and the second side of each tilting pad being arranged opposite one another, and the shaft having a free end with which the tilting pad projects at least partially into a corresponding recess of the recesses.

3. The gear assembly according to claim 2, wherein the tilting pads have a circumferential groove for receiving a securing element on the shaft on a side facing the free end.

4. The gear assembly according to claim 2, wherein the tilting pads have a coating on the first side.

5. The gear assembly according to claim 1, wherein the tilting pads have a thin hard-material layer applied by physical vapor deposition (PVD).

6. The gear assembly according to claim 1, wherein a spring element is provided between the tilting pads and the planetary carrier.

7. The gear assembly according to claim 2, wherein the tilting pads have a spherical contour on the first side.

8. The gear assembly according to claim 1, wherein the tilting pads have, at a free end, an at least partially tapering contour.

9. The gear assembly according to claim 1, wherein lubricant emerging from the bearing is supplied to the tilting pads.

10. A method of mounting a gear assembly, comprising:
   pushing a securing element onto a shaft of a respective tilting pad;
   inserting tilting pads into recesses of a planetary carrier;
   introducing planet gears into the planetary carrier by inserting the planet gears radially from the outside inward, the planet gears being arranged offset from the tilting pads to form gaps when the planet gears are not tilted; and
   driving planetary pins through passages in the planetary carrier that correspond to the respective planet gear.

11. A tilting pad with a cylindrical body with a sliding surface on a first side and a cylindrical shaft on a second side, wherein the sliding surface has a spherical contour on the first side of the body, wherein such surface has a thin hard-material layer on the spherical contour of the sliding surface, and wherein the tilting pad is arranged in a planetary gear set with the sliding surface offset from a planet gear to form a gap when the planet gear is not tilted.

* * * * *